C. D. HEILE.
WAGON AND TRUCK POLE SUPPORT.
APPLICATION FILED APR. 20, 1908.
907,349.
Patented Dec. 22, 1908.
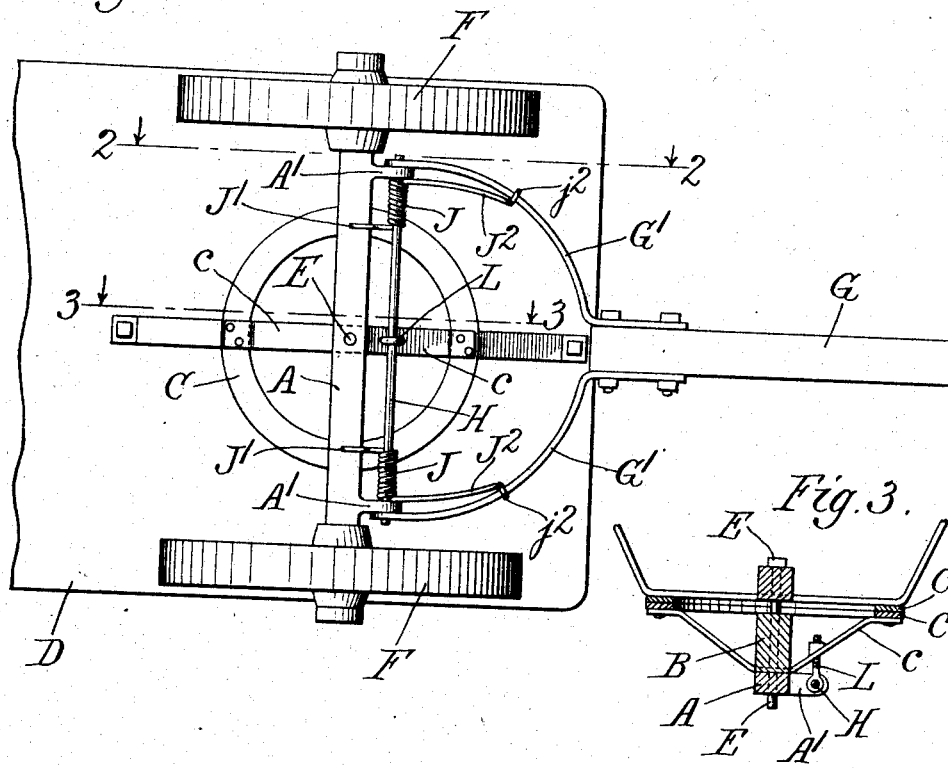
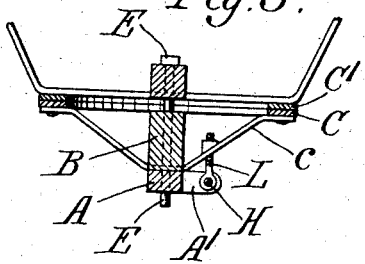
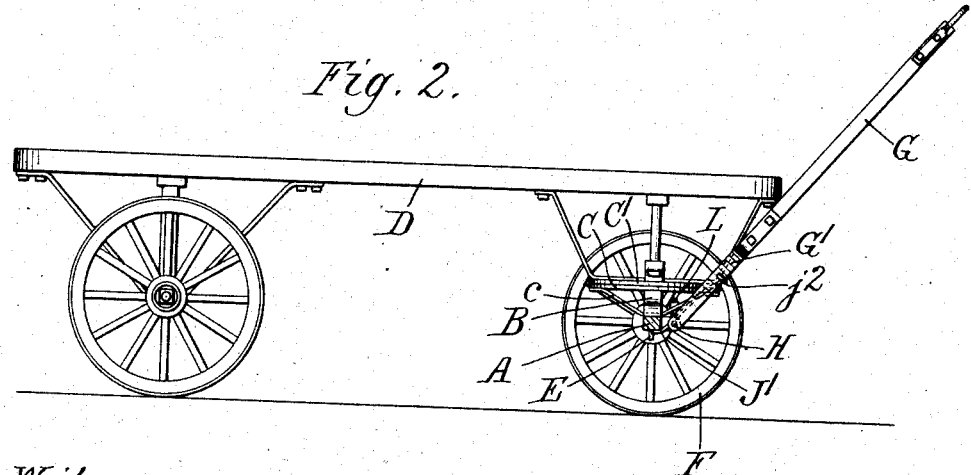
Witnesses.
Edward T. Wray.
Julia S. Abbott
Inventor.
Chas. D. Heile.
by Burton & Burton
his Attys.

UNITED STATES PATENT OFFICE.

CHARLES D. HEILE, OF EVANSTON, ILLINOIS.

WAGON AND TRUCK POLE SUPPORT.

No. 907,349.　　　Specification of Letters Patent.　　　Patented Dec. 22, 1908.

Application filed April 20, 1908. Serial No. 428,224.

*To all whom it may concern:*

Be it known that I, CHARLES D. HEILE, a citizen of the United States, residing at Evanston, in the county of Cook and State of Illinois, have invented new and useful Improvements in Wagon and Truck Pole Supports, of which the following is a specification, reference being had to the drawings forming a part thereof.

The purpose of this invention is to provide a device particularly adapted to uphold the draft pole or handle of a wagon or truck, and a draft pole or handle adapted to be upheld by such device.

It consists in the features of construction shown and described, as indicated in the claim.

In the drawings:—Figure 1 is an inverted plan view of the forward end portion of a truck or wagon having a pole and operating device embodying this invention. Fig. 2 is a partly sectional side elevation of such truck or wagon, section being made at the line 2—2 on Fig. 1. Fig. 3 is a detail section at the line 3—3 on Fig. 2.

A is the forward axle of the truck or wagon, above which there is mounted the usual customary bolster, B, and thereon the lower element, C, of the turntable, whose upper element, $C^1$, is secured to the truck or wagon body or platform, D, by the king-bolt, E, in the customary manner. The axle, A, has forward projecting lugs, $A^1$, $A^1$, just inside the wheels, F, F, respectively, and the pole, G, has diverging fork arms or bows, $G^1$, $G^1$, extending for pivotal connection with the lugs, $A^1$, $A^1$, respectively, to which they are pivotally connected by means of a rod, H, which extends across in front of the axle from lug to lug, the one rod constituting the pivot of both fork arms.

J, J are springs which are coiled about the pivot rod, H, being lodged thereon just inside the lugs respectively, and having the inner end, $J^1$, stopped under the axle, A, the outer end, which constitutes the longer arm, $J^2$, provided with a terminal hook, $j^2$, engaging under the fork arm or bow, $G^1$, the springs being made symmetrically,—as rights and lefts,—that is, coiled in opposite directions, so that being symmetrically disposed, as shown, the weight of the pole and its downward movement tend to tension the springs, and the reaction of the springs, therefore, tends to uplift and uphold the pole, as shown in Fig. 2. A sufficient extent of coil to make a durable spring with sufficient resiliency to permit the necessary range of movement of the pole up and down, if made of wire of suitable diameter to afford sufficient stiffness to uphold the weight of the pole, as is the intention of the device, requires such number of coils as to occupy a considerable distance inward from the lugs respectively; and the two arms of the spring being thus separated a considerable distance and extending in opposite directions from the pivot rod, the spring in its reaction exerts very considerable downward pressure at its inner end upon the pivot rod, H, and in the absence of precautional means operates to bend the rod, distorting the pivots from their proper alinement and cramping the pole and also causing it to work in its bearings unevenly and soon become unserviceable; and at the same time the sagging of the rod under the pressure of the springs detracts from the capacity of the springs for upholding the pole by their reaction. To overcome this defect there is provided a support for the middle of the pivot rod, consisting of a hanger in the form of an I-bolt, L, which is secured to and projects downwardly from a tie or truss bar, c, rigid with the lower turntable plate, C, and thereby rigid with the bolster, B, and axle, A.

I claim:—

In combination with a truck or wagon axle, the tongue for the truck or wagon having spreading or diverging fork arms by which it is pivoted to the axle at widely separated points thereon, the axle having lugs for pivoting the fork arms; a rod extending through both lugs and fork arms for forming both pivots; springs coiled about the rod, each stopped at one end of its coil under the axle and at the other end under one of the fork arms; turntable plates and a truss bar extending fore and aft for the lower turntable plate, and deflected downward between its fore and aft attachment to the lower turntable plate for rigid connection with the axle; a hanger carried by the truss bar and engaging the pivot rod for supporting it intermediate the springs.

In testimony whereof, I have hereunto set my hand, in the presence of two witnesses, at Chicago, Illinois, this 17th day of April, 1908.

CHARLES D. HEILE.

In the presence of—
  CHAS. S. BURTON,
  JULIA S. ABBOTT.